United States Patent
Rossi et al.

(10) Patent No.: US 6,655,919 B2
(45) Date of Patent: Dec. 2, 2003

(54) METHOD FOR ASSEMBLING A PELTON TURBINE WHEEL

(75) Inventors: Georges Rossi, Saint-Ismier (FR); Louis Finet, Vif (FR); Francis Freynet, Grenoble (FR); Bernard Michel, Vaulnaveys le Bas (FR)

(73) Assignee: Alstom Power Hydro, Grenoble (FR)

( * ) Notice: Subject to any disclaimer, the term of this patent is extended or adjusted under 35 U.S.C. 154(b) by 48 days.

(21) Appl. No.: 10/129,792

(22) PCT Filed: Dec. 6, 2000

(86) PCT No.: PCT/FR00/03412

§ 371 (c)(1), (2), (4) Date: May 10, 2002

(87) PCT Pub. No.: WO01/42645

PCT Pub. Date: Jun. 14, 2001

(65) Prior Publication Data

US 2002/0176779 A1 Nov. 28, 2002

(30) Foreign Application Priority Data

Dec. 10, 1999 (FR) .............................................. 99 15637

(51) Int. Cl.⁷ ................................................. F03B 1/02
(52) U.S. Cl. ........................... 416/197 BOD; 416/116; 416/214 A; 415/202; 29/889.21
(58) Field of Search .................. 416/197 B, 197 A, 416/214 A, 190, 192, 116; 415/202, 3.1, 6, 141; 29/889.21

(56) References Cited

U.S. PATENT DOCUMENTS

| | | | |
|---|---|---|---|
| 1,361,467 A | * | 12/1920 | Kincaid |
| 4,573,870 A | * | 3/1986 | Moussa ........................ 415/202 |
| 4,950,130 A | * | 8/1990 | Erlach .......................... 415/202 |
| 6,210,113 B1 | * | 4/2001 | Ihrenberger ................. 416/116 |

FOREIGN PATENT DOCUMENTS

| EP | 0843092 | 5/1998 |
|---|---|---|
| FR | 570124 | 4/1924 |
| FR | 2776341 | 9/1999 |
| GB | 688577 | 3/1953 |

\* cited by examiner

Primary Examiner—Edward K. Look
Assistant Examiner—J. M. McAleenan
(74) Attorney, Agent, or Firm—Dowell & Dowell, P.C.

(57) ABSTRACT

The invention concerns a method which consists in: pre-positioning, in a housing (7) of a flange (5), a bucket (2) supported by part (23) of its outer surface (23) against an edge (71) of the housing (7) providing a space (E') between the convex surface (23B) of the outer radial part (2B) of the bucket (2) and said edge (71); producing an articulated linkage (15) of the bucket (2) on the rim (1) and/or the flange (5) on the inside (2A) of the bucket (2); exerting on the outer radial part (2B) of the bucket (2) a first calibrated force to bring it closer to the edge (71); determining the distance (e) between said outer radial part (2B) and said edge (71) under said force; slackening said force; arranging, between said outer radial part (2B) and said edge (71), a wedge (53) having a thickness substantially equal to said distance (e); and exerting on the outer radial part (2B) of the bucket a second force ($F_2$) to bringing it closer to the edge and maintaining said second force ($F_2$) which has an intensity not less than that of the first force.

11 Claims, 5 Drawing Sheets

METHOD FOR ASSEMBLING A PELTON TURBINE WHEEL

The invention relates to a method for assembling a Pelton turbine wheel, to a bucket for such a wheel and to a wheel equipped with such a bucket.

Pelton turbines are conventionally used for transforming the kinetic energy of a fluid, such as the water of a waterfall, into mechanical energy. Such transformation is effected by rotating the turbine wheel under the effect of a tangential force exerted, on buckets arranged on the periphery of a rim, by a jet of water emerging from one or more injectors distributed around the wheel.

International Patent Application WO-A-99/49213 discloses using two annular flanges fast with the rim for supporting the buckets of a Pelton turbine wheel, which allows an optimized distribution of the forces undergone by the buckets, the mechanical stresses in that case no longer being concentrated in a zone of fastening of the bucket on the rim. In this known device, each bucket is in abutment, by a convex surface, against radial arms of the flanges and immobilized with respect to each flange thanks to a locking screw.

The buckets of such a turbine wheel undergo a large number of impacts due to the jets of driving fluid coming from the injectors. The effect of these impacts is to apply each bucket alternately on the radial arms against which it is in abutment, which results in an alternate stressing of the materials constituting the buckets and the flanges. In addition, the surface abutment of the buckets on the flanges necessitates a precise adjustment of the outer dimensions of each bucket and of the corresponding housings provided in the flanges. Such an adjustment does not allow interchangeability of the buckets, which accordingly renders manufacture and maintenance of such a wheel complex.

It is a more particular object of the invention to overcome these drawbacks by proposing a method for assembling a wheel, as known from WO-A-99/49213, which makes it possible to avoid that the impacts of the jets of driving fluid generate alternate fatigue and/or stressing of the bucket with respect to the rim or to the flanges.

This method consists in:
 pre-positioning, in a housing of a flange, a bucket supported by a part of its outer convex surface against an edge of this housing, providing a space between the convex surface of the outer radial part of this bucket and this edge;
 producing an articulated linkage of this bucket on the rim and/or the flange on the inside of the bucket;
 exerting on the outer radial part of the bucket a first calibrated force to bring it closer to the flange;
 determining the distance between this outer radial part and this edge under this calibrated force;
 slackening this calibrated force;
 arranging, between this outer radial part and this edge, a wedge having a thickness substantially equal to the distance mentioned above, and
 exerting on this outer radial part and maintaining a second force to bring it closer to the edge, this second force having an intensity greater than or equal to that of the first force.

Thanks to the invention, the bucket mounted on the wheel is subjected to a pre-stress formed by the second calibrated force which has the effect of immobilizing it firmly with respect to the flange and of compensating, with the wedge, the spacing existing between the outer radial part of the bucket and the flange. After establishment of the pre-stress, the wedge makes it possible to "filter" the dynamic forces exerted on the bucket, particularly at the level of its outer radial part. The use of a wedge, of thickness determined as a function of the exact geometry of the bucket and of the flange and of the reaction of the bucket to the first calibrated force of bringing closer, makes it possible to envisage an interchangeability of the buckets, only the thickness of each wedge having to be adjusted precisely to the geometry of the surrounding parts.

According to a first advantageous aspect of the invention, the method consists in exerting the calibrated forces by means of a locking screw received in a housing made in the flange and penetrating in a tapping made in the outer radial part of the bucket. The calibrated force may thus be exerted by means of a torque wrench or any other controlled tightening means and have a considerable intensity, particularly in the case of a wheel of large diameter.

According to another advantageous aspect of the invention, the afore-mentioned first and second calibrated forces for bringing closer are substantially of the same intensity. Thus, when the wheel is in mounted configuration, each bucket is in abutment against the corresponding wedge under the effect of the calibrated force used for determining the thickness of this wedge. This assembly makes it possible to obtain a constant force in the locking screws by filtering the alternate forces due to the impacts of the jets of fluid.

The invention also relates to a turbine wheel bucket carrying out the method as described hereinbefore and, more specifically, to a bucket comprising a bi-concave surface for flow of a fluid for driving the wheel and a convex surface adapted to cooperate with at least one annular flange fast with a rim of the wheel. This bucket is characterized in that its convex surface forms at least one abutment zone located against the flange and at least one zone distant from the flange in an outer radial part of the bucket, this zone distant from the flange being adapted to be brought closer to a part of the flange located opposite by a calibrated force.

According to advantageous but non-obligatory aspects of the invention, this bucket incorporates one or more of the following characteristics:
 The convex surface of the bucket also forms a zone distant from the flange in an inner radial part of the bucket. Thus, the localized abutment zone on the face is formed solely in a central part of this convex surface, which allows a certain displacement of the bucket in a radial direction.
 The bucket comprises, at the level of the outer radial part and/or the inner radial part of its concave surface, at least one guide adapted to give to the flow of the afore-mentioned fluid a divergent component which is accentuated with respect to a median edge of the bucket. This guide makes it possible to avoid the fluid in the course of flow striking a radial arm of the flange disposed opposite the concave surface of the bucket. This guide may be provided to be adapted to direct the flow up to the level of a recess made in a radial arm of the flange disposed opposite this concave surface. This guide is advantageously formed by a rib extending, from an outer radial end zone of the bucket, in the direction of an inner radial part of the bucket, this rib bordering the outer notch of the bucket.

Finally, the invention relates to a Pelton turbine wheel which comprises a rim, at least one annular flange, fast with the rim and provided with housings for receiving buckets, and at least one bucket as described hereinbefore.

Such a wheel advantageously comprises, for this bucket or for each bucket, a wedge disposed between the afore-mentioned distant zone and the flange, the bucket or each of the buckets being subjected to a calibrated force of bringing this distant zone and the flange closer.

According to another advantageous aspect of the invention, the or each flange is provided with recesses for flow of the fluid driving the turbine from the concave surface of each bucket, the recesses being formed on an outer lateral surface of the flange.

The invention will be more readily understood and other advantages thereof will appear more clearly in the light of the following description of two embodiments of a Pelton turbine wheel in accordance with its principle, given solely by way of example and made with reference to the accompanying drawings, in which.

The turbine wheel shown in FIGS. 1 to 6 comprises a rim I and buckets 2, eighteen in number in the example shown, distributed on the periphery of the rim 1. Each bucket comprises two ladles or bowls 3 separated by a median edge 4 intended to be arranged opposite one or more water or vapour injectors (not shown). The rim 1 is provided to be mounted on a shaft for transferring the movement (likewise not shown).

Figure 1:
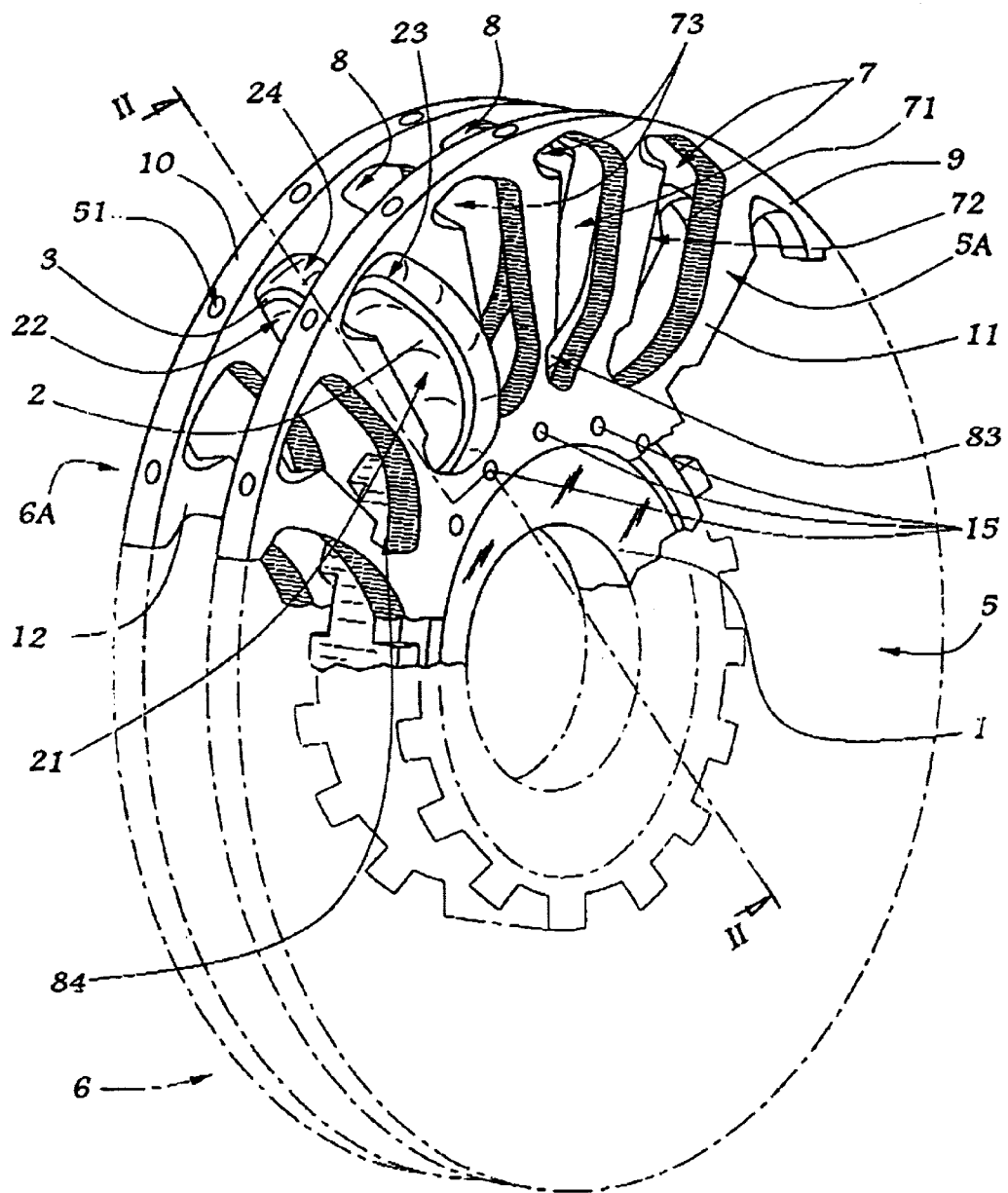
FIG. 1 is a view in partial perspective of a Pelton turbine wheel according to the invention.

In order to render the drawing clearer, only one bucket has been shown in FIG. 1.

Two ring-shaped flanges 5 and 6 are mounted on the rim 1 and contribute to holding the buckets 2 with respect to this rim. The flanges 5 and 6 are respectively provided with housings 7 and 8 in which the bowls 3 of the buckets 2 may be inserted. Two bands 9 and 10 of continuous matter are respectively formed in the outer peripheral zones of the flanges 5 and 6. These bands 9 and 10 join radial arms 11 and 12 formed by the flanges 5 and 6, respectively between adjacent housings 7 and 8.

Figure 2:
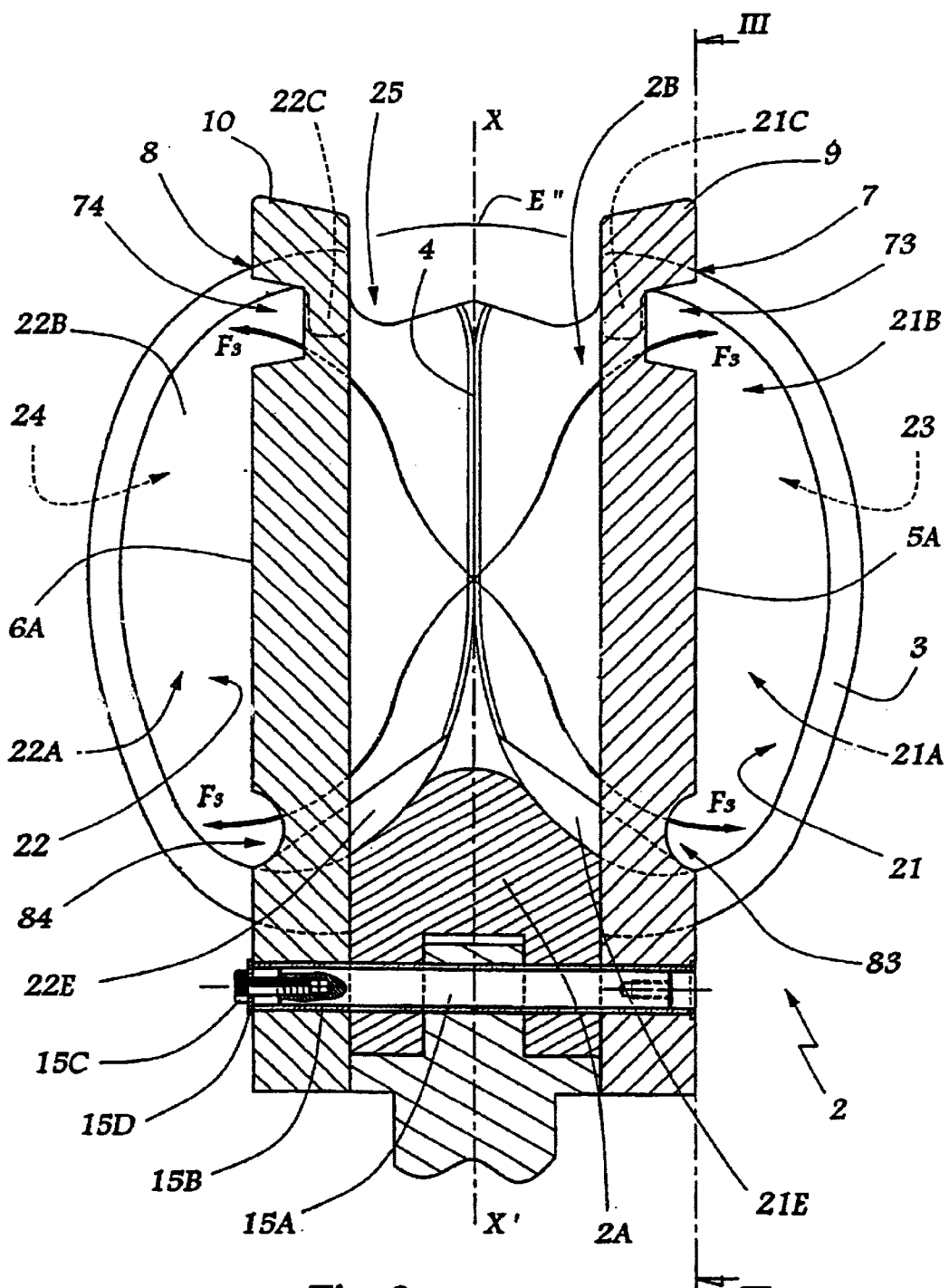
FIG. 2 is a section along line II—II in FIG. 1.

Each bucket 2 is mounted on the rim 1 and the flanges 2 thanks to a pin 15 installed as a so-called "compound" assembly and appearing more clearly in FIG. 2. This pin comprises a slightly conical principal body 15A inserted in a split sleeve 15B, itself introduced in corresponding bores in flanges 5 and 6 and the rim 1. A locking screw 15C cooperates with a washer 15D for tightening the pin 15 in position.

Each bucket 2 defines two concave surfaces 21 and 22 between which extends the edge 4 along a radial axis X–X' forming axis of symmetry of the bucket 2. The bucket 2 also defines two convex surfaces 23 and 24 together forming the outer surface of each bowl 3. Each bucket 2 comprises an inner radial part 2A at the level of which it is connected with the rim 1 and the flanges 5 and 6 by the pin 15. Each bucket 2 also comprises an outer radial part 2B located in the vicinity of the bands 9 and 10 when the wheel is in mounted configuration and in which there is defined an outer notch 25 allowing the injection of the jet of water in the bucket 2.

23A and 23B respectively denote the inner and outer radial parts of the surface 23.

Figure 3:
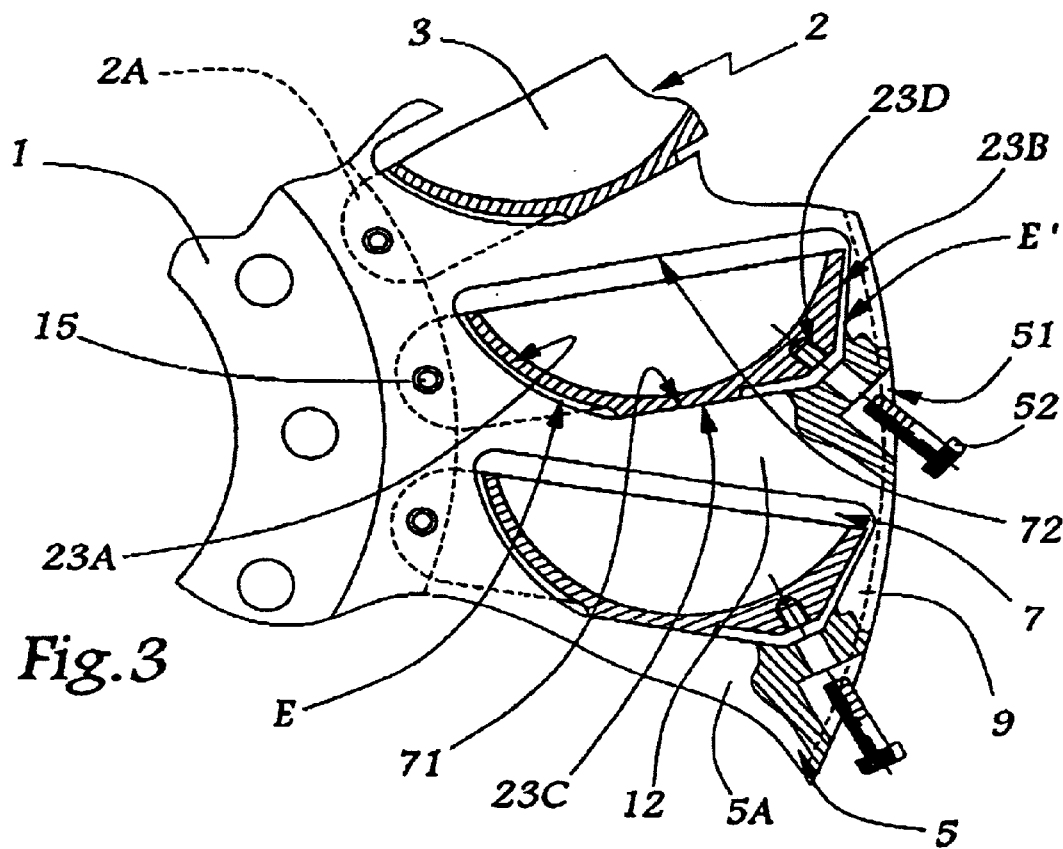
FIG. 3 is a section along line III—III in FIG. 2 during a first step of assembly of the wheel of FIG. 1, a plurality of buckets being shown.
Figure 4:
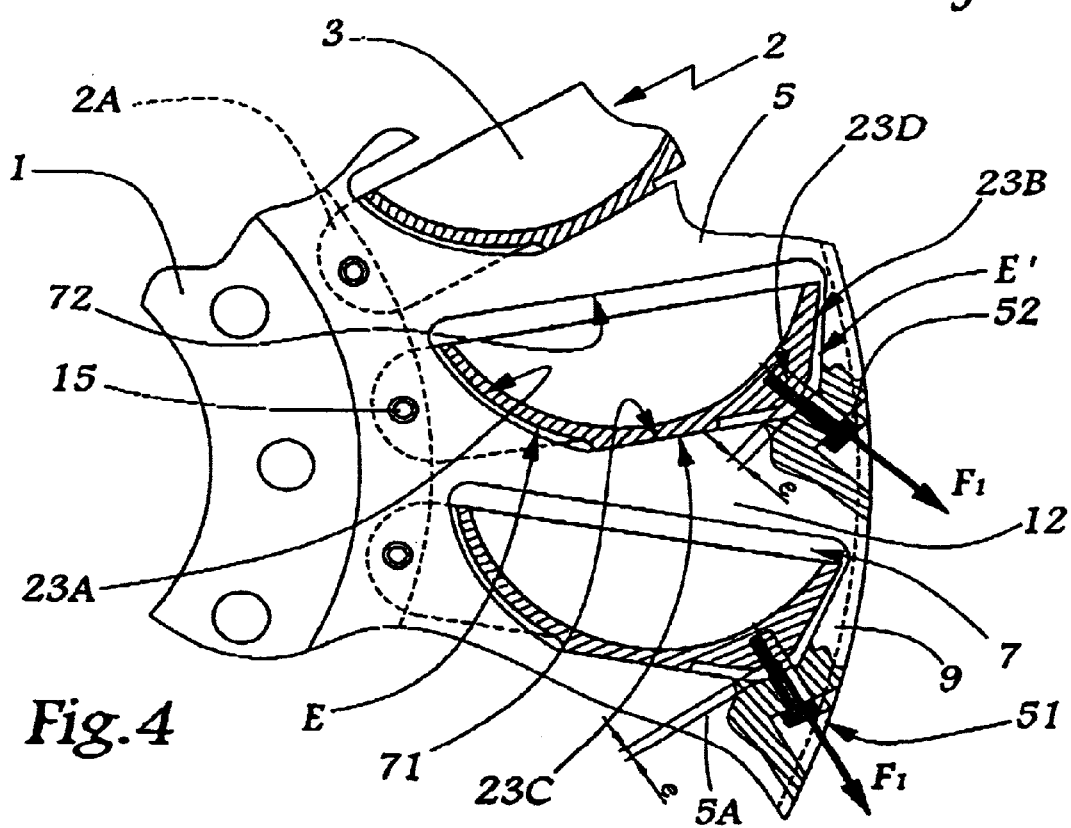
FIG. 4 is a view similar to FIG. 3 during a second step of the method of assembly.
Figure 5:
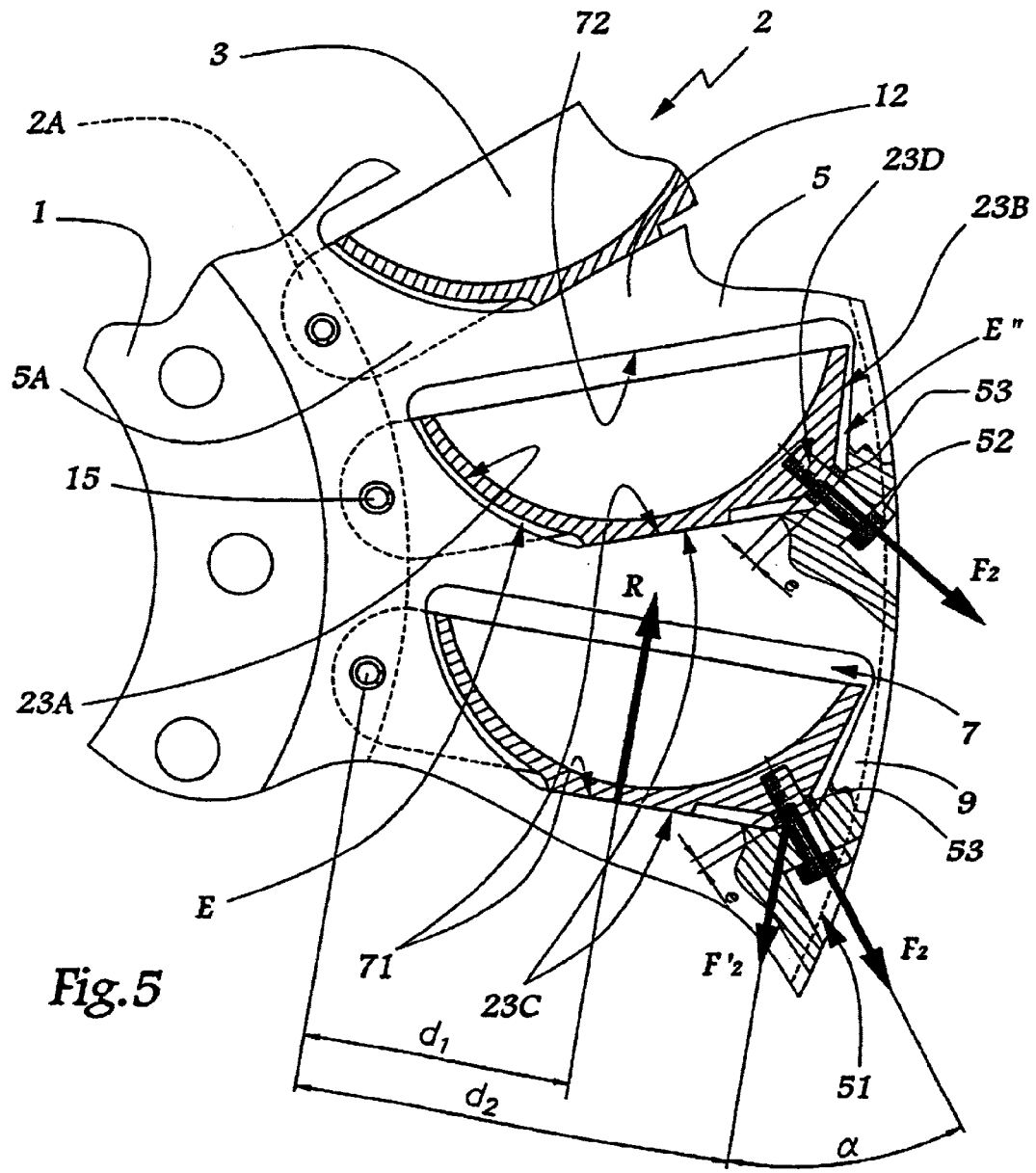
FIG. 5 is a view similar to FIG. 3 during a third step of the method of assembly.

As is more clearly visible in FIGS. 3 to 5, a heel or projecting part 23C projects beyond the surface 23 with respect to parts 23A and 23B, the heel 23C being formed in an intermediate zone of the bucket 2.

The geometry of the surface 24 is similar to that of the surface 23 and also comprises a projecting part or heel.

Each housing 7 is defined by a concave edge 71 and a substantially rectilinear edge 72 between which is inserted a bowl 3 of a bucket 2, the surface 23 of this bowl going alongside the edge 71. Similarly, each housing 8 receives the bowl 3 of the bucket 2 located on the left of axis X–X' in FIG. 2.

As is more particularly visible in FIG. 3, the geometry of the edge 71 and of the surface 23 is such that the surface 23 is in abutment against the edge 71 solely at the level of its central zone or heel 23C, two spaces E and E' being respectively formed between the part 23A and the edge 71, on the one hand, and between the part 23B and the edge 71 on the other hand.

During the step of assembly of the wheel shown in FIG. 3, each bucket 2 is positioned in the corresponding housings 7 and 8 and the pin 15 is inserted in the corresponding bores of the buckets of the rim and the flanges, without tightening this pin, so that an articulated linkage is produced of each bucket on the rim and the flanges.

There is then inserted in a housing 51 provided in the band 9 of the flange 5, a screw 52 whose shank traverses the housing 51 and may be inserted in a tapping 23D provided in the part 23B of the surface 23. The screw 52 is then screwed with a torque wrench or other controlled tightening means such as a pre-stress jack or a heating pipe, so as to obtain a calibrated force for bringing closer the part 2B of the bucket 2 and the edge 71 of the housing 7. One proceeds in the same way concerning the second bowl of the bucket 2.

One is then in the position of FIG. 4 where a calibrated force $F_1$ is exerted on the part 2B by the screw 52 and the equivalent screw provided in the second flange 6. In this configuration, the distance e existing between the part 23B of the surface 23 and the edge 71 of the housing 7 is measured. This distance e may be different from one bucket to the other taking into account the manufacturing tolerances of the rim, the flanges and the buckets. The equivalent distance between the outer part of the surface 24 and the concave edge of the housing 8 is measured.

In practice, all the buckets 2 are positioned in the housings 7 and 8 and all the screws 52 and equivalent are progressively tightened in logical order, in order to place all the buckets under pre-stress $F_1$ for bringing closer their respective outer radial parts 2B with respect to the flanges 5 and 6 in order to ensure an overall symmetry. The distances e are then measured, as these distances depend in particular on the distribution of forces in the flanges 5 and 6.

When the distances e have been determined, wedges 53 are fashioned, of which each has a thickness equal to the distance e between a bucket and the flange as defined hereinbefore. Then, after having loosened the screws 52, i.e. released the force $F_1$, each of the wedges 53 is positioned between the bucket 2 and the edge 71 or equivalent of the housing 7 or 8 in which it is inserted and for which the wedge 53 has been fashioned. In other words, each wedge 53 is intended for a couple formed by a bucket 2 and a housing 7 or 8.

When the wedge 53 is in place, the screws 52 and equivalent are tightened again, with a calibrated force $F_2$ of intensity greater than or equal to that of the force $F_1$ used previously. The outer radial part 2B of each bucket 2 is thus subjected to a force $F_2$ for bringing closer this part with respect to the edge 71 or equivalent of the housing.

As the force $F_2$ is at least as intense as the force $F_1$, one is sure that the part 23B of the surface 23 is in firm abutment against the wedge 53 which is itself in firm abutment against the edge 71 of the housing 7 or equivalent. Each bucket is thus subjected to a pre-stress $F_2$ which applies it efficiently against the flange, in pivoting about the axis of the pin 15. Each bucket 2 is therefore firmly maintained in position and does not risk oscillating under the effect of the impacts of the fluid issuing from the injectors.

The pins 15 are then tightened so that the articulated linkage created at their level is locked.

At the end of assembly, the bucket 2 may be modelized like a beam articulated towards the pin and in abutment on the central zones 23c and equivalent while it is subjected to a force of application against the edge 71.

As is more particularly visible in FIG. 5, each bucket 2 is subjected to a force of reaction R by the flange 5 or 6 and to the force $F_2$, the force $F_2$ having an intensity equal to the section of the screw 52 multiplied by the force of tightening.

In the case of a screw of type M16 tightened to 200 MPa, the force $F_2$ has a value defined as follows:

$$F_2 = 144\ mm^2 \times 200\ MPa = 28\ 800\ N$$

The tangential component $F'_2$ of the force $F_2$ is equal to $F'_2 = F_2 \times \cos(\alpha)$ where $\alpha$ is the angle of the force $F_2$ with respect to the reaction R. Assuming $\alpha$ to be equal to 30°, one obtains:

$$F'_2 = 24\ 940\ N.$$

At equilibrium, the pre-stress exerted by the force of reaction R on the bucket 2 which results from the component $F'_2$ may be expressed as a function of the distances $d_1$ and $d_2$ defined respectively between the pin 15 and a point of application of the reaction R and between the pin 15 and the point of application of the force $F_2$ such that $$R = F'_2 \times d_2 / d_1.$$

Furthermore, the force of the impact exerted by the jet on each bucket 2 may be determined by calculation and it suffices to choose the force of tightening of the screws 52 and equivalent and the ratio $d_2/d_1$ for the force R to be permanently greater than or equal to the force undergone by the bucket under the effect of the impact mentioned above. A safety coefficient of the order of 1.5 may, for example, be used.

Thus, each bucket is firmly maintained in position with respect to its environment and the material constituting it is not stressed in fatigue by the impacts that it undergoes.

The method of the invention is efficient as long as the force $F_2$ is greater in value than the force $F_1$, which makes it possible to ensure that each bucket 2 is effectively applied against the adjacent wedge 53 or equivalent.

According to an advantageous variant of the invention, the forces $F_1$ and $F_2$ may be substantially equal, in which case the screws 52 and equivalent are not subjected to a high elongation force while each bucket is efficiently maintained in position.

The fact that a space E is provided between the part 23A of the surface 23 and the edge 71 ensures that the system formed by a bucket 2 and a flange 5 or 6 is isostatic.

Figure 6:
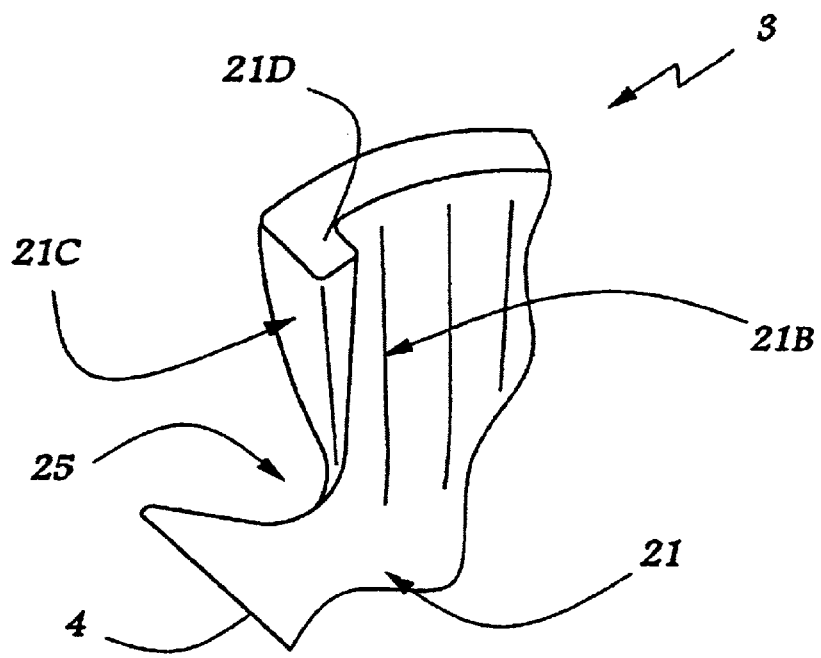
FIG. 6 is a view in partial perspective of the bucket of the wheel of FIGS. 1 to 5.

As is more particularly visible in FIGS. 2 and 6, the outer radial parts 21B and 22B of the concave surfaces 21 and 22 are each provided with a rib 21C or 22C adjacent the notch 25. The function of these ribs is to deviate the flow of water represented by arrow $F_3$ in FIG. 2 towards the outside of the space E″ defined between the flanges 5 and 6.

In order to avoid the flow of water deviated by the ribs 21C and 22C striking the rectilinear edges 72 and equivalent of the housings 7 and 8, these edges are provided, on the outer faces 5A and 6A of the flanges 5 and 6, with recesses, 73 for the edges of housings 7 and 83 for the edges of housings 8. Thanks to these recesses 73 and 83, the flow of water $F_3$ may be evacuated without generating a force of braking of the wheel which might occur if the water flowing over the surfaces 21 and 22 struck the edges 72 and equivalent of the housings 7 and 8.

As is more particularly visible in FIG. 6, the rib 21c has a depth and a thickness which decrease on moving away from the edge 21D of the surface 21.

Figure 7:
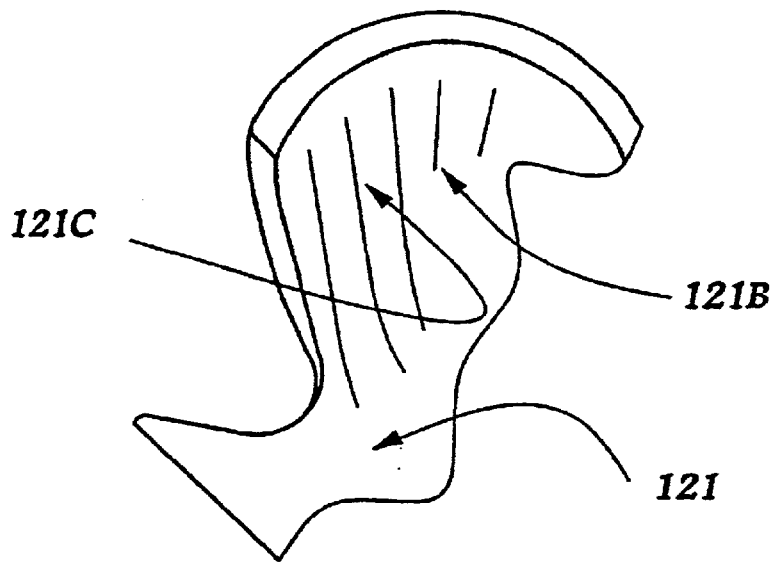
FIG. 7 is a view similar to FIG. 6 for a bucket according to a second embodiment of the invention.

As shown in FIG. 7, the function of the rib 21c may also be obtained by a concave zone 121C provided in the outer radial part 121B of the concave surface 121 of a bucket in accordance with a second embodiment.

Towards the inner part 21A or 22A of the surfaces 21 and 22, the latter are provided with a lining 21E or 22E making it possible also to divert the flow $F_3$ towards the outside of the flanges 5 and 6, without interference with the rectilinear edges of the housings 7 and 8.

As before, recesses 74 and 84 may be provided on the flanges 5 and 6, at the level of the edges of the housings 7 and 8, to avoid an interference between the flow $F_3$ and these edges. In a variant, the linings 21E and 22E extend up to outside the flanges 7 and 8, with the result that it is not necessary to provide recesses in the inner parts of the arms 11 and 12.

The invention has been described with a turbine wheel comprising a rim and two flanges added on this rim. It is also applicable to the case of the rim being formed by two half-rims each integrating an annular part forming flange, as described in the second embodiment of WO-A-99/49213 and, more generally, to any turbine wheel comprising a rim and at least one flange.

What is claimed is:

1. Method for assembling a turbine wheel of Pelton type comprising a rim (1), a plurality of buckets (2) distributed over the periphery of this rim and at least one annular flange (5, 6) fast with said rim and provided with housings (7, 8) for receiving said buckets, characterized in that it consists in:
   pre-positioning, in a housing (7) of said flange, a bucket (2) supported by a part (23C) of its outer convex surface (23) against an edge (71) of said housing, providing a space (E') between the convex surface (23B) of the outer radial part (2B) of said bucket and said edge (71);
   producing an articulated linkage of said bucket (2) on the rim and/or said flange (5) on the inside (2A) of said bucket;
   exerting on said outer radial part (2B) of said bucket a first calibrated force ($F_1$) to bring it closer to said flange;
   determining the distance (e) between this outer radial part (2B) and this edge (71) under said force ($F_1$);
   slackening said force ($F_1$);
   arranging, between said outer radial part (2B) and said edge (71), a wedge (53) having a thickness substantially equal to said distance (e), and
   exerting on said outer radial part (2B), and maintaining a second force ($F_2$) to bring it closer to said edge (71), said second force ($F_2$) having an intensity greater than or equal to that of said first force ($F_1$).

2. Method according to claim 1, characterized in that it consists in exerting said calibrated forces ($F_1$, $F_2$) by means of a locking screw (52) received in a housing (51) made in said flange (5, 6) and penetrating in a tapping (23D) made in the outer radial part (2B) of said bucket (2).

3. Method according to claim 1, characterized in that said first and second calibrated forces ($F_1$, $F_2$) for bringing closer are substantially of the same intensity.

4. Pelton turbine wheel bucket comprising a bi-concave surface (21, 22) for flow ($F_3$) of a fluid for driving said wheel and a convex surface (23, 24) adapted to cooperate with at least one annular flange (5, 6) fast with a rim (1) of said wheel, characterized in that said convex surface (23) forms at least one abutment zone (23C) located against said flange (5, 6) and at least one zone (23B) distant from said flange in an outer radial part (2B) of said bucket (2), said zone (23B) distant from said flange being adapted to be brought closer to a part of the flange located opposite, by a calibrated force ($F_1$, $F_2$).

5. Bucket according to claim 4, characterized in that said convex surface (23, 24) forms a zone (23A) distant from said flange (5, 6) in a radial part (2A) inside said bucket (2).

6. Bucket according to claim 4, characterized in that it comprises, at the level of the outer radial part (21B,22B) and/or the inner radial part (21A, 22A) of its concave surface (21,22), at least one guide (21C,22C,21E,22E) adapted to give the flow ($F_3$) of said fluid a divergent component accentuated with respect to the median edge 94) of said bucket (2).

7. Bucket according to claim 6, characterized in that said guide (21C, 22C, 21E, 22E) is adapted to direct said flow ($F_3$) up to the level of a recess (73, 74, 83, 84) made in a radial arm (11, 12) of said flange (5, 6) disposed opposite said concave surface (21, 22).

8. Bucket according to claim 7, characterized in that said guide is formed by a rib (21C,22C) extending, from an outer radial end zone (2B) of said bucket (2), in the direction of an inner radial part (2A) of said bucket, this rib bordering an outer notch (25) of said bucket.

9. Pelton turbine wheel comprising a rim (1) and at least one annular flange (5,6) fast with said rim and provided with housings (7,8) for receiving buckets, characterized in that it comprises at least one bucket (2) according to claim 4.

10. Turbine wheel according to claim 9, characterized in that it comprises, for said bucket (2) or each of said buckets, a wedge (53) disposed between said distant zone (23B) and said flange (5, 6), said bucket or each of said buckets being subjected to a calibrated force ($F_2$) for bringing said distant zone and said flange closer.

11. Turbine wheel according to claim 10, characterized in that said or each flange (5,6) is provided with recesses (73,74,83,84) for flow of the fluid driving the turbine from the concave surface (21,22) of each bucket (2), said recesses being formed on an outer lateral surface (5A,6A) of said flange (5,6).

\* \* \* \* \*